United States Patent [19]

Williams

[11] 4,044,978
[45] Aug. 30, 1977

[54] BOAT MOTOR DISPLAY AND WORK STAND

[76] Inventor: James F. Williams, 2004 Knollwood Drive, Grand Rapids, Minn. 55744

[21] Appl. No.: 684,748

[22] Filed: May 10, 1976

[51] Int. Cl.² .............................................. F16F 15/00
[52] U.S. Cl. .......................................... 248/13; 248/4; 280/DIG. 2; 280/79.1
[58] Field of Search .................. 248/2, 4, 13, 25, 500; 280/47.13, 79.1 R, 79.1 A, DIG. 2

[56] References Cited

U.S. PATENT DOCUMENTS

| 2,266,683 | 12/1941 | Berglund | 280/DIG. 2 |
|---|---|---|---|
| 2,380,017 | 7/1945 | Blicker | 248/4 X |
| 2,827,714 | 3/1958 | Hyde | 280/DIG. 2 |
| 2,966,319 | 12/1960 | Todish et al. | 248/4 X |
| 3,045,851 | 7/1962 | Rubert | 280/DIG. 2 |
| 3,100,048 | 8/1963 | Halverson | 248/4 X |
| 3,190,593 | 6/1965 | Kreger | 248/25 |
| 3,595,502 | 7/1971 | Galloway | 248/13 |
| D. 150,753 | 8/1948 | Carr | 248/13 UX |

FOREIGN PATENT DOCUMENTS

| 1,286,337 | 1/1962 | France | 280/DIG. 2 |
|---|---|---|---|
| 252,465 | 10/1912 | Germany | 248/13 |
| 308,012 | 1/1969 | Sweden | 248/13 |

Primary Examiner—Lawrence J. Staab
Attorney, Agent, or Firm—Dorsey, Windhorst, Hannaford, Whitney & Halladay

[57] ABSTRACT

A stand for supporting boat motors comprising a generally horizontally disposed base and a motor support means for supporting said boat motor on said base comprising connection means for connecting the stand to the cavitation plate of said boat motor on said each side of said motor and a support member extending between said base and said connection means.

6 Claims, 6 Drawing Figures

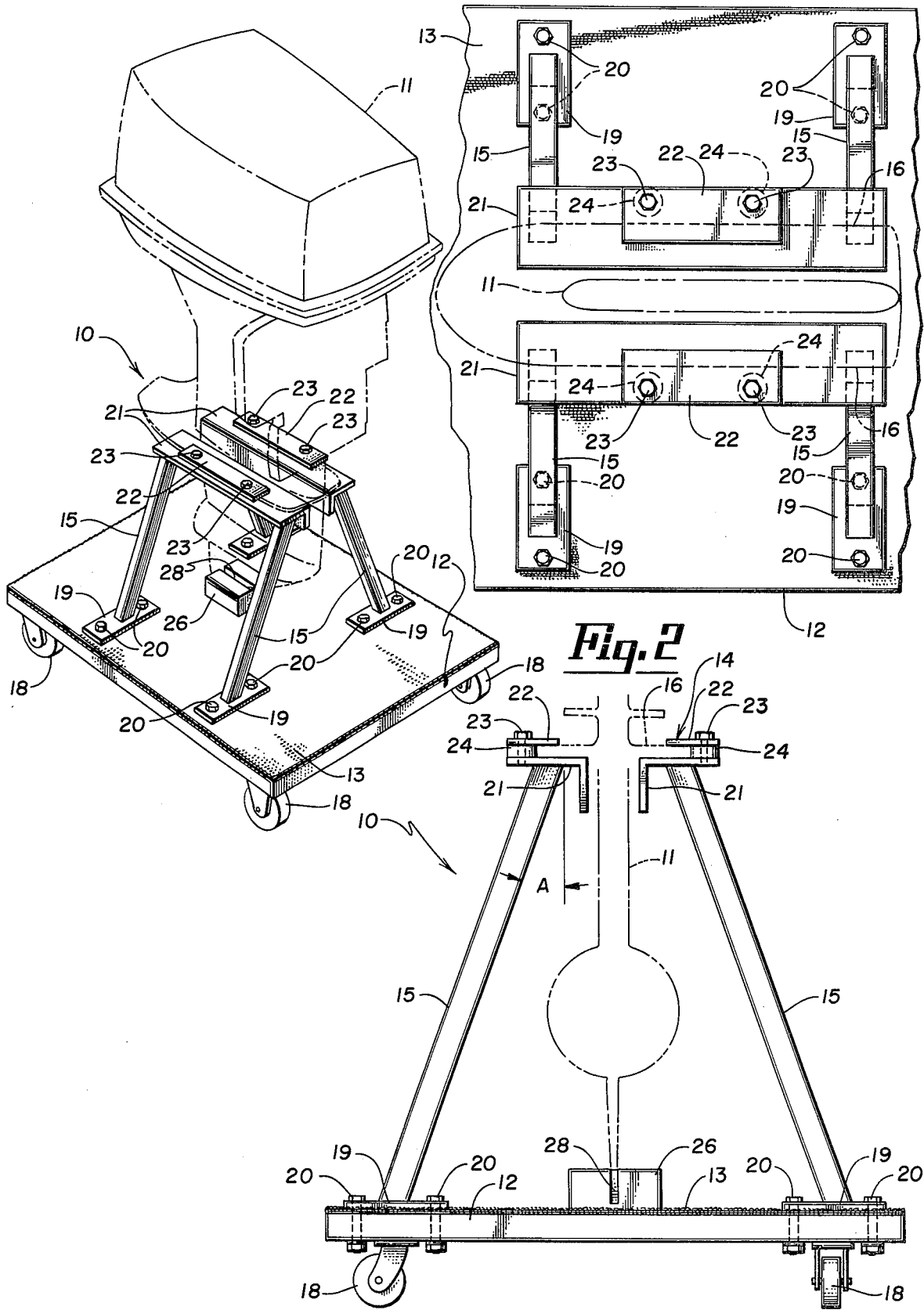

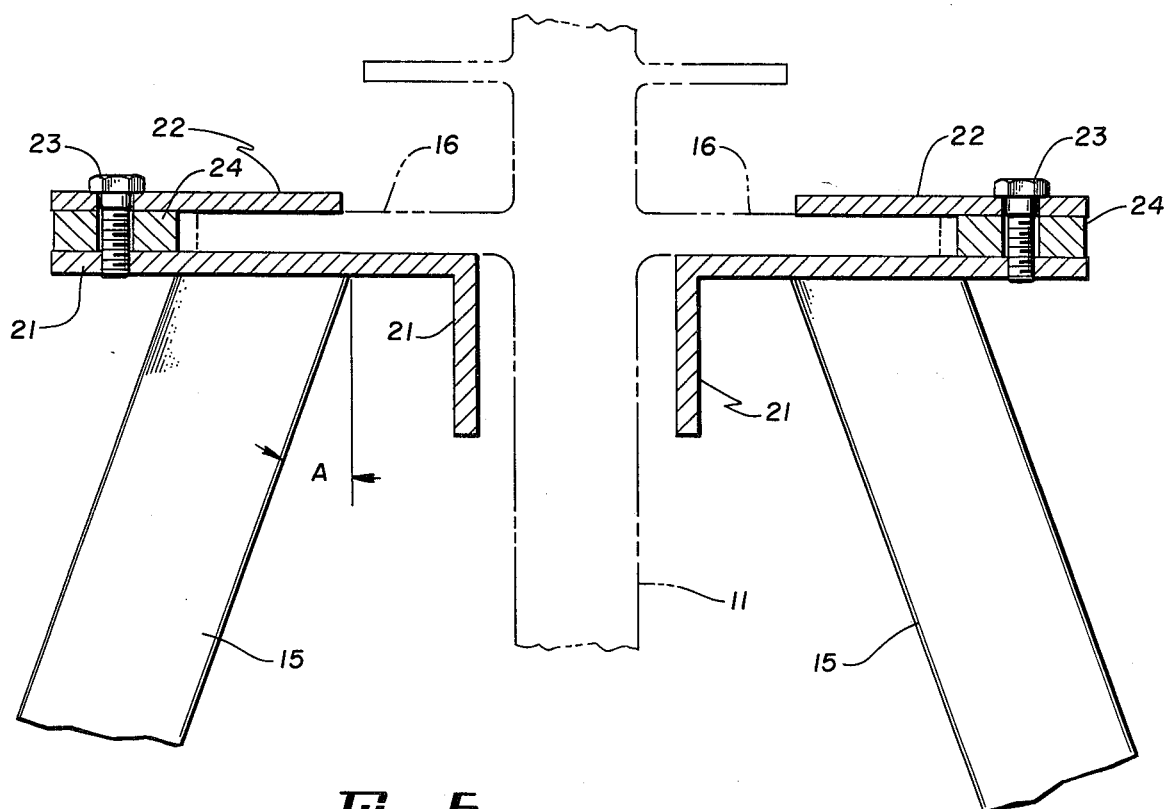
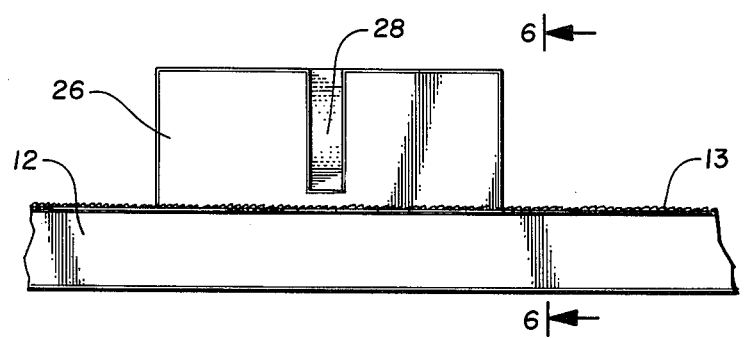
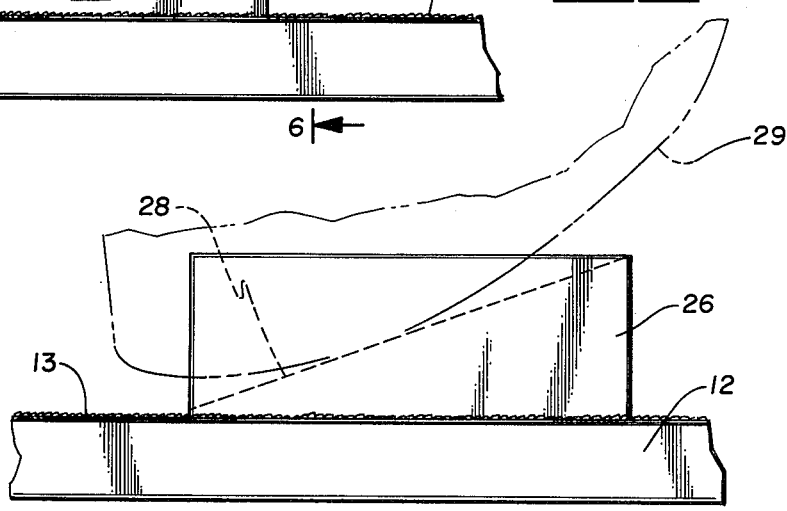

BOAT MOTOR DISPLAY AND WORK STAND

BACKGROUND OF THE INVENTION

The present invention relates generally to a stand for supporting boat motors, and more particularly, to an outboard motor display and work stand.

In the prior art, outboard motors are typically mounted for display or maintenance purposes on a structure having a portion which resembles, in part, the transom of the boat. Motors are mounted onto these structures as they would be mounted onto the boat itself, by utilizing the transom mounting elements of the motor. These prior support stands have several disadvantages. First, such stands do not allow view of the entire motor. When motors are mounted onto these stands, portions are hidden from view, particularly portions of the power tilt and trim systems. Secondly, such stands generally lack means for efficiently and easily moving the same together with the motor attached from one location to another. Thus, it is difficult, if not impossible, to move a particular motor from one location to another either for display or maintenance purposes without actually removing the motor from the stand or somehow moving the entire stand with the motor attached. Thirdly, due to the fact that the motor is mounted to these prior art stands at the transom mounting level of the motor, the base is necessarily quite large, thereby resulting in inefficient utilization of existing maintenance or display space.

For the reasons discussed above, there is a real need in the art for an outboard motor display and work stand which can be moved easily from one location to another with the motor attached, which displays the entire motor from the lower-most part of the skeg to the top of the motor cover, and which provides for efficient utilization of existing maintenance and display space. Such a stand is particularly needed for larger motors with power tilt and trim systems.

SUMMARY OF THE INVENTION

In contrast to the prior art, the present invention relates to a boat motor stand and particularly, to an outboard motor display and work stand which uses approximately the same floor space as the motor itself and which can be moved to various shop or display areas by a single person or rolled up to boats and shown as a mounted motor without the necessity of drilling or rigging the boat. Further, the stand of the present invention allows the entire motor from the bottom of the skeg to the top of the motor cover, including the power tilt and trim system, to be exposed for display or maintenance, and because of its mobility, facilitates the arrangement of a variety of displays to make each and every showroom look its very best.

More particularly, the present invention relates to a stand for supporting boat motors comprising a generally horizontally disposed base, connection means in the form of a pair of clamp members structurally connected with the base by a support member and positioned on each side of the boat motor for clamping engagement with a portion of the cavitation plate of the boat motor. Such clamp members are supported vertically above the base a distance of not less than the distance between the cavitation plate and the lower end of the motor. The cavitation plate of an outboard motor comprises a thin horizontally disposed plate-like member extending about the periphery of the motor substantially below the normal transom mounting portion of the motor, and approximately halfway between such transom mounting portion and the lower end of the skeg. Thus, the mounting engagement between the motor and the stand of the present invention occurs at a substantially lower level than that of prior art stands, thereby requiring a smaller base in order to achieve the necessary stability. Additional features of the present invention include the provision of a block member associated with the base for aiding in the support and stability of the motor and the provision of wheel means on the lower surface of the base to provide the desired mobility.

Accordingly, it is an object of the present invention to provide a boat motor display and work stand which displays the entire motor from the skeg to the top of the motor cover, including the power tilt and trim system.

Another object of the present invention is to provide a motor display and work stand which permits the easy movement of a single motor from one display or work area to another.

A further object of the present invention is to provide a boat motor display and work stand in which the motor is supported via clamping engagement between the stand and the cavitation plate.

A further object of the present invention is to provide a boat motor display and work stand which takes up no more space than the motor itself, and thereby makes efficient use of display and work space.

These and other objects of the present invention will become apparent with reference to the drawings, the description of the preferred embodiment, and the appended claims.

DESCRIPTION OF THE DRAWINGS

FIG. 1 is a pictorial view of the boat motor stand of the present invention with the motor being shown in broken lines.

FIG. 2 is a front elevated view of the boat motor stand of the present invention with a portion of the motor being shown in its mounted position by broken lines.

FIG. 3 is a top view of the boat motor stand of the present invention with a portion of the motor being shown in broken lines.

FIG. 4 is a detailed sectional view of the clamping engagement between the boat motor stand and the cavitation plate of the motor.

FIG. 5 is an elevational view of the front of the supporting block member.

FIG. 6 is a side elevational view of the supporting block member with a portion of the boat motor shown in broken lines.

DESCRIPTION OF THE PREFERRED EMBODIMENT

Reference is first made generally to FIG. 1 and more specifically to FIGS. 2, 3 and 4 in which the boat motor stand of the present invention is indicated generally by reference numeral 10. The boat motor stand 10 is designed to support an outboard motor 11 and comprises, in general, a base 12, a means 14 adapted for clamping engagement with the cavitation plate 16 of the motor 11 and a plurality of support elements 15 extending between the means 14 and the base 12.

The base 12 is a generally rectangular, horizontally disposed element having a flat upper surface and a flat lower surface. As illustrated best in FIG. 2, wheel means in the form of the casters 18 are connected with the lower surface of the base 12 to give the stand mobility and thus provide a means for easily moving the motor from one location to another. Although only two casters 18 are visible in FIG. 2, the base 12 includes a second, similarly located pair of casters on the opposite side. The base 12 can be constructed from a variety of materials, however, in the preferred embodiment it is constructed from particle board about an inch and a quarter thick. Also, the base of the preferred embodiment is covered with a marine vinyl carpeting 13 or other covering generally impervious to oil and grease.

As shown best in FIGS. 1, 2 and 3, a support member in the form of a plurality of support elements 15 are connected to, and extend between, the base 12 and the clamping means 14. Specifically, each of the support elements 15 is connected with a plate member 19 by appropriate means such as welding, which plate member is in turn secured to the base 12 by a plurality of bolts 20. The bolts 20 extend through the plate members 19 and the base 12 and threadedly receive a nut on the underside of the base 12. It is contemplated that the support elements 15 can be constructed from a variety of materials, however, in the preferred embodiment, such members are constructed from one inch square, 14 gauge steel tubing. The members 15 extend upwardly from the base 12 at an angle of approximately seventy degrees.

Connected with the upper ends of the elements 15 is the cavitation plate connection or clamping means 14 which comprises a pair of clamping members 21 and 22 positioned on each side of the boat motor 11. As illustrated best in FIGS. 1 and 4, each clamp member 21 comprises an elongated angle member rigidly secured to, and extending between, two of the support members 15 such that when it is so supported, the member 21 includes a generally horizontally disposed portion and a generally vertically disposed portion extending downwardly from the side of the horizontal portion adjacent to the motor 11. The angle structure of the member 21 provides such member with strength and rigidity sufficient to support the motor 11. The lower surface of each member 21 is secured to the upper ends of its two support members 15 by appropriate means such as welding.

As is illustrated in the drawings, each of the clamp members 21 comprises an elongated member having a longitudinal axis extending generally in the direction of the elongated dimension thereof and oriented such that its longitudinal axis is generally parallel to the longitudinal axis of the other elongated clamping member 21 and such that the longitudinal axes are generally equally spaced from each other. Also, it should be noted that each of the elongated clamp members 21 includes an inner, top surface for engaging and supporting a portion of the cavitation plate 16 along a substantial portion of the length of such plate.

Associated with each clamp member 21 and positioned in spaced relationship thereabove is a second clamp member 22. In the preferred embodiment, the clamp member 22 is a relatively rectangular, flat member whose width is less than the width of the horizontal portion of the member 21 and whose length is less than the length of the horizontal portion of the member 21. The member 22 is secured to the member 21 by a pair of threaded cap screws 23 which extends through the member 22 and is threadedly received by the clamp member 21. Positioned between the clamp members 21 and 22 is a spacing means to provide proper clamping engagement between the members 21 and 22 and the cavitation plate 16. In the preferred embodiment, the spacing means comprises a spacing washer 24 disposed about each of the screws 23.

The function of the clamping members 21 and 22 in the present invention is to provide clamping engagement between the boat motor stand and the cavitation plate 16 of the boat motor. Specifically, as shown best in FIG. 4, the lower surface of the cavitation plate 16 on each side of the motor 11 is designed to rest upon the upper surface of the corresponding member 21. The members 22 are designed to extend over a portion of the upper surface of the cavitation plate and, by appropriate rotation of the cap screws 23, to clamp the cavitation plate against the clamp member 21. The spacing washer 24 disposed between the members 21 and 22 should preferably be of a thickness approximating the thickness of the cavitation plate 16.

Each of the clamp members 21 should be sufficiently long to provide support for the boat motor 11. In the preferred embodiment, as shown in FIGS. 1 and 3, the members 21 are almost as long as the cavitation plate 16 itself. This provides the motor 11 with sufficient support and stability. Also, in the preferred embodiment, the two vertically disposed portions of the members extend downwardly from the side of their corresponding horizontal portions adjacent to the motor 11. The inventor has found that a distance of about two inches between these vertically extending portions is sufficient for most large outboard boat motors.

Also, in construction of the preferred embodiment, the inventor has found that the support members 15 should be positioned, relative to the vertical, at an angle A of approximately 20° as shown in FIG. 2. Although this angle can vary, the angle must be such as to provide sufficient stability to the stand, as well as provide efficient utilization of the floor space.

Associated with the upper surface of the base 12 is a block member 26 adapted for engagement with the skeg 29 (the lower portion) of the boat motor 11. As shown in FIGS. 1, 2, 5 and 6, the block member 26 comprises a relatively rectangular block having an elongated angular slot 28 positioned therein. As shown best in FIG. 6, the slot 28 angles from a position near the base 12 to the upper surface of the block 26 in order to provide the desired wedging action between the base 12 and the skeg 29. When properly positioned, the block member 26 helps to support the weight of the engine 11 on the base 12 and provides additional stability to the engine. In actual operation, the block member 26 is driven under the skeg 29 after the motor has been slid onto the clamping members 21, but prior to securement of the clamping members to the cavitation plate 16. In the preferred embodiment, the block member 26 comprises a 2 × 4 × 4 wooden block, although it is anticipated that in the actual commercial embodiment, a variety of alternative support members could be used, so long as they served the intended function of providing stability and support.

In order to operate the stand of the present invention, the two clamp members 22 are first removed from the stand and the outboard motor 11 is slid onto the stand with the cavitation plate 16 resting on top of the clamp members 21, 21. The block member 26 is then driven under the motor skeg, after which the two clamp members 22 are secured to the clamp members 21 via the screws 23. The appropriately sized spacing washers 24 are positioned between the members 21 and 22 so that when secured, the clamp members 21 and 22 are generally parallel to each other. The motor is then secure and can be moved about as the result of the wheel means or casters 18 disposed on the lower surface of the base 12.

Although the description of the preferred embodiment of the present invention has been quite specific, it is contemplated that various changes and modifications could be made to the structure without deviating from the spirit of the present invention. For example, it is contemplated that a variety of clamping or connection means could be used to connect and secure the cavitation plate 16 to the stand, other than the pair of clamping members 21 and 22 described in the preferred embodiment. Similarly, it is anticipated that the base could comprise a frame structure in which a substantial portion of the surface of such base is open. Accordingly, applicant intends that the scope of the present invention be dictated by the appended claims rather than by the description of the preferred embodiment.

I claim:

1. A stand for supporting boat motors comprising:
   a base lying in a generally horizontal plane and having wheel means connected thereto;
   means for supporting said boat motor on said base comprising connection means for connecting the stand to the cavitation plate of said boat motor on said each side of said motor and a support means extending between said base and said connection means for supporting said connection means in spaced relationship above said base;
   said connection means including a pair of corresponding clamps spaced and adapted for straddling said boat motor, said clamps each including first and second clamp members being disposed one above the other and adapted for clamping a portion of said cavitation plate therebetween, each of said first clamp members comprising a first elongated member positioned below its corresponding second clamp member and having a longitudinal axis extending generally in the direction of its elongated dimension and orientated such that its longitudinal axis is generally parallel to the longitudinal axis of the other first elongated member and generally equally spaced therefrom, each of said first elongated members further having an inner, top surface for engaging and supporting a portion of said cavitation plate along a substantial portion of the length thereof, each of said second clamp members being positioned in spaced relationship above said inner, top surface of its corresponding first elongated member, said connection means further including means connected with said first and second clamp members for providing a clamping action between said clamp members;
   said support means including a support member connected with each of said first clamp members and extending outwardly and downwardly therefrom to said base to form an included angle with said generally horizontal plane of less than 90°.

2. The stand of claim 1 having means associated with said base for engaging the lowermost part of the boat motor and aiding in the support thereof.

3. The stand of claim 1 wherein said means for providing a clamping action comprises a threaded member being threadedly received by at least one of said first clamp members and a spacing means disposed between said first and second clamp members.

4. The stand of claim 1 wherein each of said first elongated members comprises an elongated angle member, one surface of which lies in a generally horizontal plane and the other surface of which lies in a generally vertical plane.

5. The stand of claim 1 wherein said support member extends outwardly and downwardly from said first clamp members to said base to form an included angle of approximately 70° with said generally horizontal plane.

6. A stand for supporting boat motors comprising:
   a generally horizontally disposed base;
   a motor support means for supporting said boat motor on said base comprising connection means for connecting the stand to the cavitation plate of said boat motor on said each side of said motor and a support member extending between said base and said connection means; and
   means associated with said base for engaging the lowermost part of the boat motor and aiding in the support thereof, said means including a block member having an elongated slot of varying depth adapted to be positioned between said base and the boat motor skeg.

* * * * *